US010268674B2

(12) United States Patent
Tamilchelvan et al.

(10) Patent No.: US 10,268,674 B2
(45) Date of Patent: Apr. 23, 2019

(54) LINGUISTIC INTELLIGENCE USING LANGUAGE VALIDATOR

(71) Applicant: Dell Products L.P., Round Rock, TX (US)

(72) Inventors: Bhuvaneswari Tamilchelvan, Singapore (SG); Lakshmi Narasimhan M C, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/483,877

(22) Filed: Apr. 10, 2017

(65) Prior Publication Data

US 2018/0293231 A1    Oct. 11, 2018

(51) Int. Cl.
*G10L 17/00* (2013.01)
*G06F 17/22* (2006.01)
*G06F 17/24* (2006.01)
*G06F 17/27* (2006.01)
*G06F 17/28* (2006.01)
*G06F 17/30* (2006.01)

(52) U.S. Cl.
CPC ........ *G06F 17/275* (2013.01); *G06F 17/2725* (2013.01)

(58) Field of Classification Search
CPC .... G06F 3/018; G06F 17/2247; G06F 17/246; G06F 17/24; G06F 17/289; G06F 17/2872; G06F 17/2785; G06F 17/30864; G06F 17/30427; G06F 17/30286; G06F 9/4448; G06F 9/44589; G06F 8/10; G06F 8/71; G06F 8/52; G10L 17/005
See application file for complete search history.

(56) References Cited

U.S. PATENT DOCUMENTS

| 5,576,955 | A  | * | 11/1996 | Newbold | ................. | G06F 3/14 |
|           |    |   |         |         |                   | 395/795   |
| 6,092,036 | A  | * | 7/2000  | Hamann  | ................. | G06F 9/454 |
|           |    |   |         |         |                   | 704/8     |
| 6,526,426 | B1 | * | 2/2003  | Lakritz | ............... | G06F 17/2258 |
|           |    |   |         |         |                   | 704/8     |
| 6,623,529 | B1 | * | 9/2003  | Lakritz | ............... | G06F 17/2288 |
|           |    |   |         |         |                   | 707/E17.109 |
| 7,441,184 | B2 | * | 10/2008 | Frerebeau | ............. | G06F 17/272 |
|           |    |   |         |         |                   | 715/234   |

(Continued)

*Primary Examiner* — Anne L Thomas-Homescu
(74) *Attorney, Agent, or Firm* — Jackson Walker L.L.P.

(57) ABSTRACT

A language validation system includes a language validation module (LVM) and a linguistic intelligence engine (LIE). The LVM may perform language validation on text in a source document. The LVM may identify a language of origin for each word or sentence in the document. The LVM may determine whether a word/sentence not of the expected language constitutes a true defect. The LVM may provide input to an LIE database as the LVM identifies new words/sentences. The LIE may remain dormant for an initial interval until it obtains a sufficient vocabulary. Eventually, the LIE may be sufficiently knowledgeable to perform automated translations requests to translate original documents in the original language into one or more source documents in one or more source language. The LIE may adapt or otherwise implement a particular style in accordance with a style guide or analogous information.

8 Claims, 4 Drawing Sheets

(56) References Cited

U.S. PATENT DOCUMENTS

| | | | |
|---|---|---|---|
| 7,987,087 B2* | 7/2011 | Rich | G06F 9/454 704/2 |
| 8,219,907 B2* | 7/2012 | Kohlmeier | G06F 8/38 715/264 |
| 8,296,124 B1* | 10/2012 | Holsztynska | G06F 17/28 704/2 |
| 8,484,218 B2* | 7/2013 | Raghunath | G06F 17/2818 707/739 |
| 8,606,559 B2* | 12/2013 | Jin | G06F 17/2755 704/2 |
| 8,676,563 B2* | 3/2014 | Soricut | G06F 17/28 704/2 |
| 8,789,015 B2* | 7/2014 | Lerum | G06F 9/44 717/120 |
| 8,825,692 B1* | 9/2014 | Telnov | G06F 17/2229 707/760 |
| 8,910,122 B2* | 12/2014 | Baumann | G06F 9/4448 717/126 |
| 9,081,579 B2* | 7/2015 | Sharrma | G06F 8/36 |
| 9,081,769 B2* | 7/2015 | Liu | G06F 17/289 |
| 9,129,335 B1* | 9/2015 | Norwood | G06Q 30/0641 |
| 9,442,744 B2* | 9/2016 | Lerum | G06F 9/4448 704/2 |
| 9,483,450 B2* | 11/2016 | Chitikena | G06F 17/2247 |
| 9,710,463 B2* | 7/2017 | Prasad | G06F 17/289 |
| 9,753,918 B2* | 9/2017 | Waibel | G10L 13/043 |
| 9,804,862 B2* | 10/2017 | Dmytryshyn | G06F 9/4448 704/2 |
| 2002/0116399 A1* | 8/2002 | Camps | G06F 12/00 707/200 |
| 2005/0131672 A1* | 6/2005 | Dalal | G06F 17/277 704/2 |
| 2006/0156278 A1* | 7/2006 | Reager | G06F 9/454 717/104 |
| 2006/0161434 A1* | 7/2006 | Faisman | G10L 15/22 704/246 |
| 2006/0200766 A1* | 9/2006 | Lakritz | G06F 15/00 715/234 |
| 2007/0016401 A1* | 1/2007 | Ehsani | G06F 17/2872 704/9 |
| 2007/0033579 A1* | 2/2007 | Andrews | G06F 8/71 717/136 |
| 2007/0050182 A1* | 3/2007 | Sneddon | G06F 17/2836 704/2 |
| 2007/0073678 A1* | 3/2007 | Scott | G06F 17/30 707/5 |
| 2008/0183459 A1* | 2/2008 | Simonsen | G06F 17/20 704/1 |
| 2008/0091407 A1* | 4/2008 | Furihata | G06F 17/2827 704/4 |
| 2008/0189096 A1* | 8/2008 | Apte | G06F 9/454 704/2 |
| 2009/0063126 A1* | 3/2009 | Itagaki | G06F 17/2818 704/2 |
| 2009/0276415 A1* | 11/2009 | Dane | G06F 17/30616 |
| 2009/0281789 A1* | 11/2009 | Waibel | G06F 17/2735 704/3 |
| 2010/0286979 A1* | 11/2010 | Zangvil | G06F 17/273 704/9 |
| 2011/0010351 A1* | 1/2011 | Szimmetat | G06F 17/30867 707/695 |
| 2011/0179073 A1* | 7/2011 | Nilsson | G06F 9/454 707/769 |
| 2011/0184722 A1* | 7/2011 | Sneddon | G06F 17/289 704/7 |
| 2011/0276945 A1* | 11/2011 | Chasman | G06F 9/45 717/124 |
| 2011/0307241 A1* | 12/2011 | Waibel | G10L 15/265 704/2 |
| 2012/0016655 A1* | 1/2012 | Travieso | G06F 17/2827 704/2 |
| 2012/0192096 A1* | 7/2012 | Bowman | G06F 3/0481 715/780 |
| 2013/0124987 A1* | 5/2013 | Lakritz | G06F 17/289 715/264 |
| 2013/0198093 A1* | 8/2013 | Taylor, III | G06Q 50/18 705/311 |
| 2014/0019113 A1* | 1/2014 | Wu | G06F 17/2735 704/2 |
| 2014/0297252 A1* | 10/2014 | Prasad | G06F 17/289 704/2 |
| 2014/0358518 A1* | 12/2014 | Wu | G06F 17/2836 704/3 |
| 2014/0358519 A1* | 12/2014 | Mirkin | G06F 17/2854 704/3 |
| 2015/0206447 A1* | 7/2015 | Vahid | G09B 5/08 |
| 2015/0213007 A1* | 7/2015 | Liu | G06F 17/2827 704/2 |
| 2016/0162478 A1* | 6/2016 | Blassin | G06Q 10/06311 706/12 |
| 2016/0321160 A1* | 11/2016 | Joo | G06F 11/3608 |
| 2017/0169104 A1* | 6/2017 | Bain | G06F 17/30696 |
| 2017/0177591 A1* | 6/2017 | Acevedo Arizpe | G06F 17/3071 |
| 2017/0235724 A1* | 8/2017 | Grewal | G06F 17/2881 704/9 |
| 2017/0263248 A1* | 9/2017 | Gruber | G10L 15/22 |
| 2017/0322820 A1* | 11/2017 | Dmytryshyn | G06F 9/4448 |
| 2017/0371861 A1* | 12/2017 | Barborak | G06F 17/2785 |
| 2018/0011833 A1* | 1/2018 | Uchiyama | G06F 17/271 |
| 2018/0011842 A1* | 1/2018 | Waibel | G10L 13/043 |
| 2018/0024978 A1* | 1/2018 | Watanabe | G06F 17/243 |
| 2018/0039622 A1* | 2/2018 | Bihani | G06F 17/2854 |
| 2018/0060310 A1* | 3/2018 | Chenon | G06F 17/2854 |
| 2018/0067927 A1* | 3/2018 | Gadepalli | G06F 17/289 |
| 2018/0075508 A1* | 3/2018 | Hewavitharana | G06Q 30/0623 |

* cited by examiner

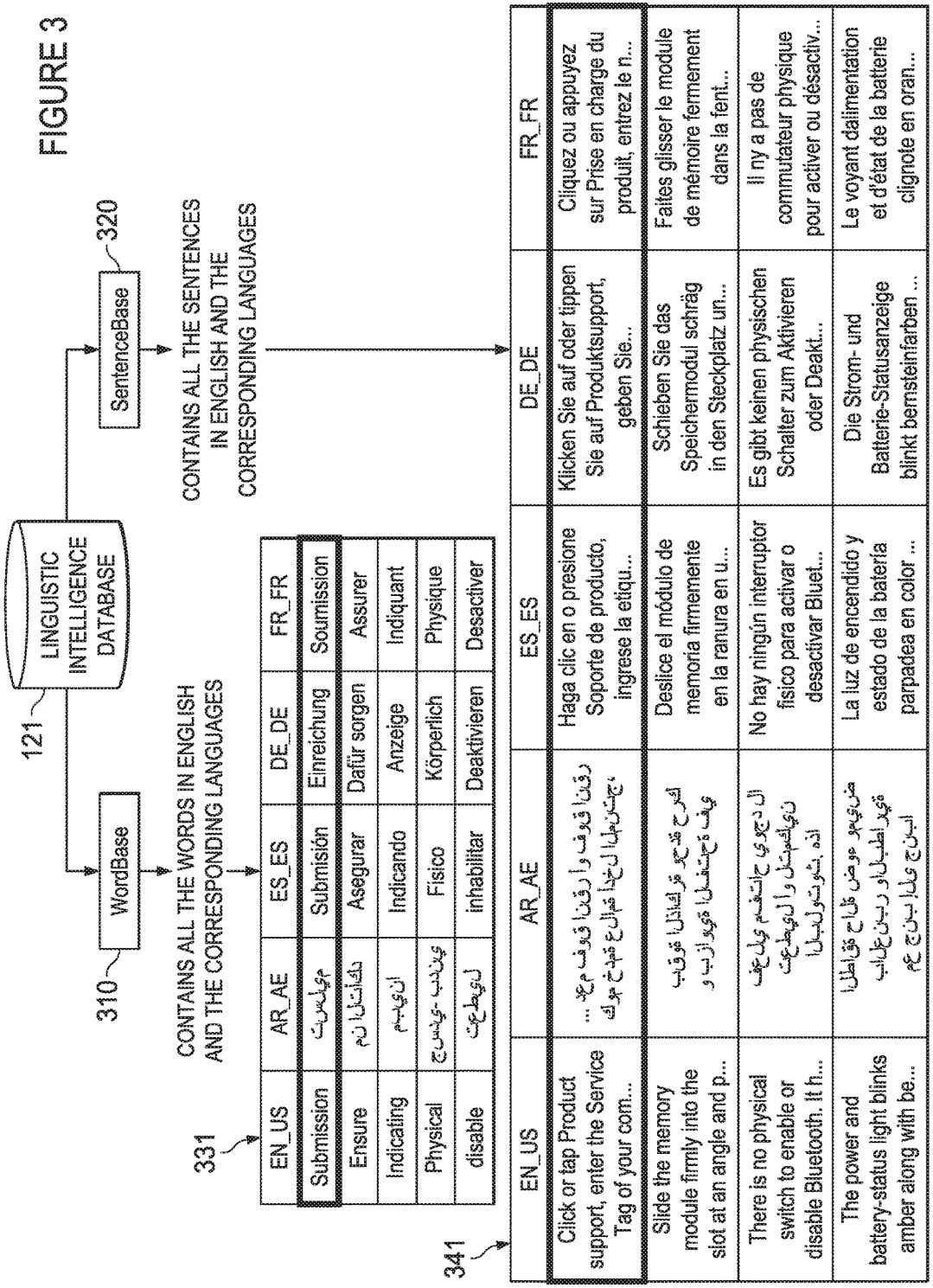

LINGUISTIC INTELLIGENCE USING LANGUAGE VALIDATOR

TECHNICAL FIELD

The present disclosure generally relates to language translation resources and, more particularly, resources for generating documentation in multiple languages.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

Companies that distribute advanced products internationally face numerous challenges whenever a product is launched. One significant challenge is converting all documentation including, as examples, wire frames, user interfaces, manuals, web pages, and so on to multiple languages. Typically, documents requiring translation are sent to a translator for each applicable language. Translation services may represent a significant expense in the launch of a new product or service.

In addition, while some entities have a group of personnel that determine the accuracy of documents generated by translators, unless such a group has at least one person fluent in every language required, the company may have to distribute documentation in one or more languages that is not fully verified.

SUMMARY

Disclosed subject matter improves/addresses the challenges listed above with a language validation resource, referred to herein as a language validation and linguistic intelligence (LVLI) resource for automating at least some portion of a document translation project. A disclosed LVLI platform may include a language validation module (LVM) and a linguistic intelligence engine (LIE). In at least one embodiment, the LVM processes source document content, where a source document represents a source language translation, whether generated by human or machine, of an original document written in an original language. The LVM may be configured to perform an automated validation process that eliminates or reduces manual intervention. As used herein, the term language validation may refer to a process of confirming that the textual components of a source document, which is intended for speakers and readers of a source language, are recognizable parts of the source language.

In at least one embodiment, all source documents that need translation validation may be placed in a single folder. The LVLI resource may extract the contents from each source document and save the resulting collection of content as a single text string (STS) document comprising a plurality of textual components. The textual components of the STS document may then be parsed or split into one or more list documents, which may include a word list document, a sentence list document, and so forth.

Parsing an STS document into a word list document may proceed using, for example, white space, blank spaces, and certain punctuation marks including commas, to identify word boundaries. An analogous process may then be performed to split the STS document into sentences for a sentence list document. Sentences may be demarcated by periods, question marks, exclamation points, and so forth, perhaps in conjunction with other punctuation associated with beginnings and endings of sentences. For example, to distinguish between the use of a period to denote an abbreviated word from use of the period to terminate a sentence, the sentence may be identified by verifying capitalization of the next word.

Once the STS has been parsed into one or more list documents, each textual component within the applicable list document, whether word, sentence, or another linguistic element, may then be provided to a text classification utility to identify a language of origin for the textual component.

Each textual component of a list document may be presented to the language classification utility, e.g., serially, one after the other. For each textual component, the language classification utility may detect, determine, or otherwise identify a language-of-origin for the textual component. The language of origin detected by the text classification utility may be referred to herein as the detected language. If the detected language of a textual component matches the expected language, i.e., the source document's language of origin, further validation processing of the textual component may be unnecessary and the LVM may prepare to process the next textual component in the list.

If the detected language for a textual component differs from the expected language, the textual component represents a potential defect and potential defect operations may be performed. Defects may occur when a particular textual component does not get translated, gets translated incorrectly, or has been translated to some other language.

The LVM may include a rules manager to analyze potential defects and categorize them as either valid defects or invalid defects. As suggested by its name, the rules manager may be configured to apply a set of one or more rules to potential defects to determine if the potential defect is a valid defect. Localization guidelines/rules may encompass any set of rules for validating a textual component. The rules manager may be configured to return a digital result, e.g., TRUE/FALSE for each potential defect. If the rules manager output is FALSE, then the corresponding textual component is marked as a valid defect or, more simply, a defect. If the rules manager output is TRUE, then the textual component complies with the localization guidelines and is therefore not a defect. In this case, the textual component is stored to the LIE as a newly discovered word, sentence, etc.

For valid defects, the LVM may retrieve the textual component along with the page number, line number, paragraph number or other location-identifying information in which the defect occurred. A globally unique identifier (GUID) of the topic in which the defect was found may also be recorded as well as a publication version, which may be retrieved from the source document.

All of this defect information may be incorporated into a result file. In this manner, a particular defect may be subsequently accessed based on the GUID of the topic in which the defect was found, the version number and the exact word.

The LIE may remain dormant for an initial period, e.g., during which time it may be exposed to continuous learning in the form of input received from the LVM. Eventually, the LIE will acquire sufficient vocabulary/intelligence to function as an automated translation module. In such embodiments, the LIE may be configured to translate an original file from an original language content into a source document in the desired source language. Moreover, if the LIE is "trained" in accordance with a particular linguistic style, e.g., according to a particular style guide subscribed to by the entity, the documents generated by the linguistic value may reflect the entity's style.

Accordingly, linguistic resources described herein may include an LVM, which validates the content in a source document generated by a human or machine translator. In addition, the linguistic resources may include an LIE and a corresponding database, which receives continuous or frequent inputs from the LVM and which, with the support of a linguistic testing team, may grows its intelligence.

The LIE may remain dormant for a specified interval while it "learns" one or more source languages as it receives information from the LVM. Eventually, the LIE may become sufficiently knowledgeable to perform automated original-to-source language translation tasks to generate one or more source documents in in one or more source languages. The LIE may adapt or otherwise implement a particular style in accordance with a style guide or analogous information.

Thus, in accordance with disclosed subject matter, an LVLI method and system extract text from one or more source documents into an STS and parse the textual components of the STS into one or more list documents. The LVLI method and system may then perform language validation operations on each textual component in the list document.

Language validation operations of disclosed methods/systems may include presenting each textual component to a language classification utility to identify a language of origin, referred to herein as the detected language, of the textual component. If the detected language fails to match the source language, the textual component may be flagged as a potential defect and potential defect operations may be performed. Potential defect operations may include: passing the textual component to a defect manager comprising one or more localization rules and determining, in accordance with the one or more localization rules, whether the textual component comprises a valid defect. Responsive to determining that the textual component comprises a valid defect, defect information corresponding to the defect may be stored to a validation output file or otherwise recorded for subsequent analysis.

Each of textual component may correspond to a particular linguistic element including, as non-limiting examples: a word or a sentence. Apart from the initial extracting of text from the source document, the remaining operations may be performed multiple times corresponding to multiple list documents, to validate the source document at two or more different linguistic levels. For example, post-extraction operations may be performed a first time with respect to a word list document to validate the source document at a word level. The post extraction operations may then be performed a second time with respect to a sentence list document, during which the document's sentences are subjected to validation.

Defect information logged, stored, or otherwise considered may include the textual component itself, information identifying a location of the textual component within the source document, e.g., page and line numbers, paragraph numbers, etc.; version information identifying a publication version; and a globally unique identifier of the defect.

The defect engine may be configured to determine whether a defect candidate, i.e., a word, sentence or other textual component for which the detected language differs from the expected language, satisfies one or more rules or criteria for recognizing defect exceptions. For instance, the expected language may lack a native term for an particular textual component, in which case the defect manager may accept the textual component in its original language form as an acceptable or non-defective element of the source language.

The method may be extended beyond language validation by employing an LIE to accumulate knowledge acquired through validation. Once the LIE accumulates information sufficient to provide coverage exceeding a particular threshold for the applicable language, the LIE may perform original-to-source document translations analogous to the translations currently or historically provided by human translators and translation services.

The LIE may accumulate linguistic knowledge by configuring the LVLI platform wherein textual components that mismatch in the initial language detection operation are added to an LIE database if the defect engine determines that the textual component is not a true defect. The LIE database may be structured as a look up table or as an indexed data structure in which each textual component is indexed or otherwise associated with an original language equivalent. When an LIE database acquires sufficient knowledge of one or more source languages, the LIE may be invoked to automatically generate one or more of the source documents from the original file.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 illustrates elements of the linguistic intelligence engine of FIG. 1B in accordance with disclosed subject matter.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1A:
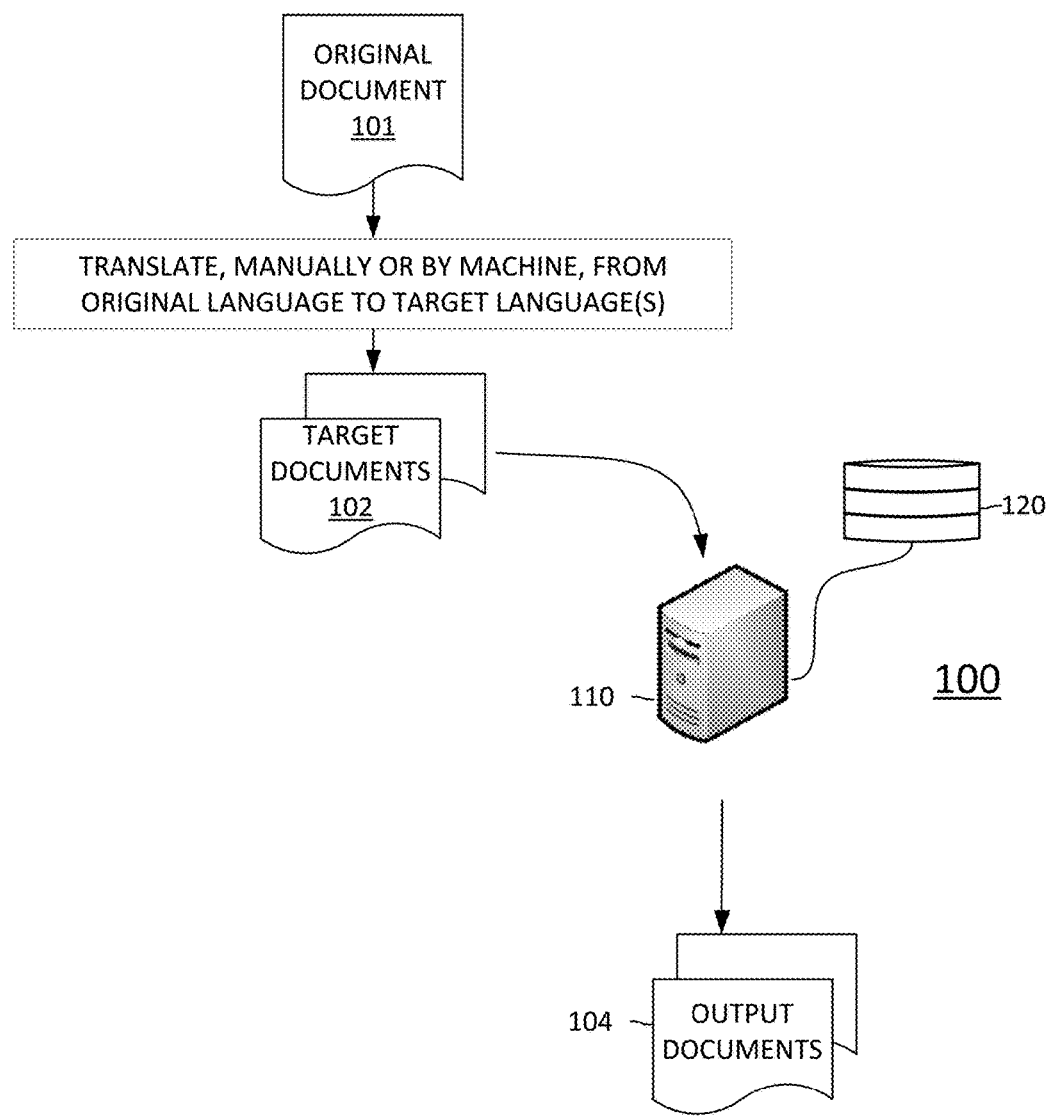
FIG. 1A illustrates a language validation platform in accordance with disclosed subject matter.

FIG. 1A illustrates an LVLI platform 100 suitable for implementing automated LVLI processes described herein. The LVLI platform 100 illustrated in FIG. 1A includes an LVLI information handling system 110, alternatively referred to herein as LVLI server 110 communicatively coupled to a database referred to herein as LIE database 121.

Figure 1B:
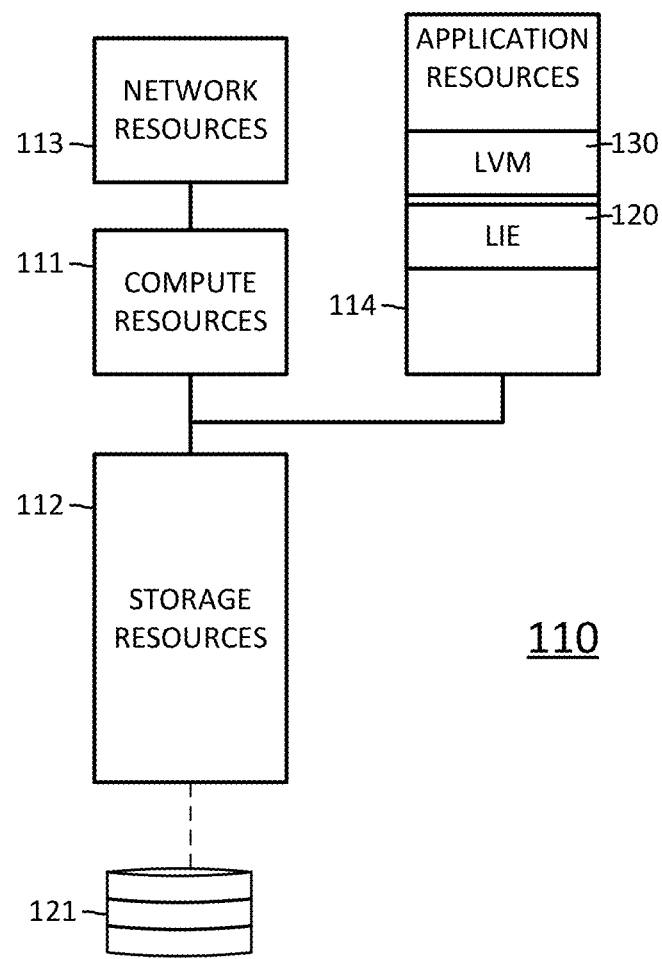
FIG. 1B illustrates elements of the language validation platform of FIG. 1A, including a language validation module and a linguistic intelligence engine in accordance with disclosed subject matter.

LVLI server 110 may be implemented as one or more physical or virtualized information handling resources. FIG. 1B illustrates an example LVLI server 110, which includes compute resources 111 coupled to storage resources 112, network resources 113, and application resources 114, each of which may be implemented as a physical or virtualized resource either on-premises or within a public or private cloud.

Compute resources 111 may include one or more processors or processing resources required to support application resources 114 including LIE 120 and LVM 130. Network resources 113 may provide physical or virtualized switching and networking resources enabling LVLI server 110 to communicate with other resources locally or remotely via one or more external networks including the Internet. Storage resources 112 may support storage for an LIE database 121 that is accessible to LIE 120, LVM 130, or both. LVLI server 110 may include resources for supporting functionality including, as non-limiting examples, a front-end module that provides a portal or other Web interface for users, a database management module that supports LIE 120 and LIE database 121 as well as other resources as needed including redundant resources to provide high availability and fault tolerance, load balancing modules to provide high performance, and so forth.

The application resources illustrated in FIG. 1B include an LVM 115 which may be configured to perform language validation operations on one or more source document(s) 102 (illustrated in FIG. 1A). Each source document 102 may represent a human-generated or machine-generated source language translation, of an original document 101 written in an original language. If a document translation project involves translating multiple original documents 101, written in an original language, to one or more source languages, LVM 120 may validate source documents 102 corresponding to each original document 101 and each source language.

The original language may represent a default or predetermined language that does not vary or does not vary frequently. As an example, a U.S. corporation might implement a policy specifying English as the original language for all or substantially all documents that may require language translations. Although not strictly required, the use of a single predetermined language as the original language for all original documents may beneficially and substantially reduce the number of cross-language tuples that the platform may need to support. Illustrating this point, a document translation project involving N source languages may need to support N*(N−1) original-to-source translation tuples in the most general case whereas the same project would only need to support N−1 original-to-source translations. In other words, the ratio of translation combinations required to support N languages in the most general case to translation combinations required when an original language is implemented is N:1. Thus, for substantially any translation project, the effort conserved by limiting the number of original document languages is considerable.

The process by which source documents 102 are generated in accordance with an original document 101 may include manual processes as well as automated processes. In manual embodiments, source documents 102 for each source language desired are generated manually by one or more persons fluent in the original language as well as the source language. In other embodiments, including embodiments described herein, all or some of the original-to-source translations may be generated automatically with an LIE such as the LIE 130 illustrated in FIG. 1B.

Each source document 102 illustrated in FIG. 1A may be validated by LVLI server 110 as described herein. The validation process may generate an output file 104 corresponding to each source document 102. In at least some embodiments, the content of output files 104 is limited to content indicating language validation exceptions or "defects." Defects may correspond to textual components from the source document 102 that were not recognized as valid by the validation process. In such embodiments, source documents 102 that have few or no errors produce small or no output files 104.

Figure 2:
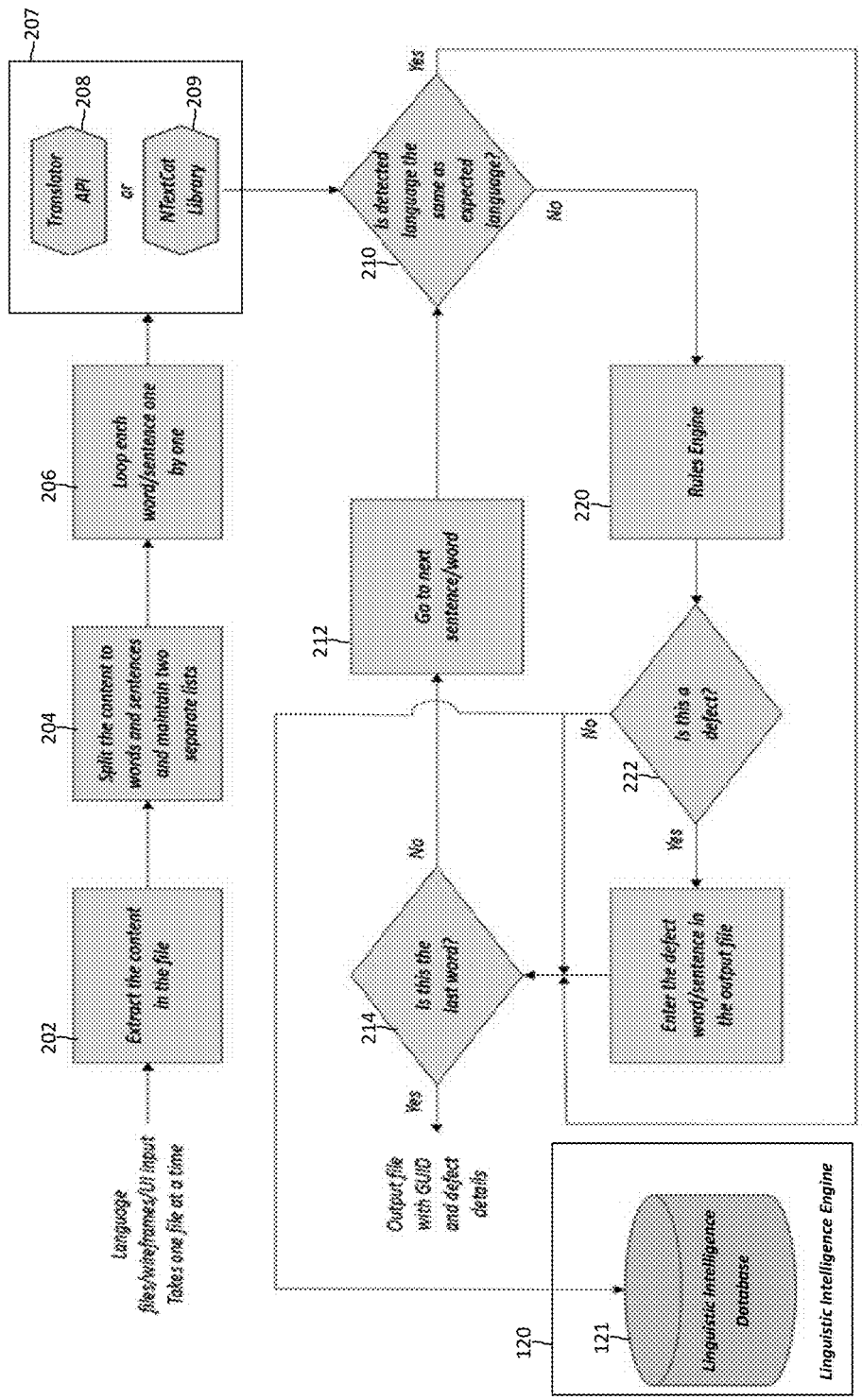
FIG. 2 illustrates a flow diagram of a language validation method in accordance with disclosed subject matter.

FIG. 2 illustrates a flow diagram of a language validation method 200. Language validation method 200 may be used to automatically evaluate and validate the accuracy of source documents 102 translated from an original document 101. The language validation method 200 illustrated in FIG. 2 includes extracting (block 202) the contents of a source document 102 into an intermediate document referred to herein as an STS document.

The STS document may then be parsed (block 204) into one or more list documents in which each list document corresponds to a different level of linguistic granularity including, as non-limiting examples, a word list document comprising a plurality of words and a sentence list document comprising a plurality of sentences, and a hybrid word list document comprising a plurality of elements where each element is either a word or a multi-word phrase such as a noun phrase, a verb phrase, and an idiom phrase.

In at least one embodiment, the STS document is parsed into two particular list documents, a word list document and a sentence list document. In such embodiments, the parsing represented by operation 204 in language validation method 200 includes parsing the STS document into a word list document and parsing the STS document into a sentence list document. Other embodiments, however, may employ more, different, or fewer, list documents corresponding to more, fewer, or different levels of linguistic granularity.

Parsing an STS document into word list document and a sentence list document beneficially produces a multi-level validation where each level of validation is organized in accordance with familiar and objectively identifiable linguistic elements. Words, for example, are can be demarcated and identified by the presence or occurrence of white space and/or punctuation marks. Sentences can also be demarcated and identified by the presence of sentence-ending punctuation including a period, question mark, and/or exclamation point, followed by white space and a capitalized next word. Again, however, although FIG. 2 identifies a sentence list and a word list document as the list documents into which the STS document is parsed, other embodiments may parse the STS document into list documents corresponding to different linguistic elements such as multi-word textual components including noun phrases, verb phrases, and idiom phrases as three non-limiting examples. While such linguistic elements may be more challenging to identify subjectively, they may yield different benefits in terms of validation and linguistic intelligence. In at least one embodiment, word parsing may be combined with multi-word phrase parsing to produce a list document that includes words and multi-word phrases.

After a list document has been generated, the language validation method 200 illustrated in FIG. 2 loops (block 206) on a sequence of component validation operations, performing the sequence once for each textual component in the list document. Thus, for each word in a word list document or each sentence in a sentence list document, the component validation operations within loop 206 attempt to validate the applicable textual component.

As part of the component validation operations, language validation method 200 may leverage one or more text classification resources to detect (block 207) a language of origin of a textual component. FIG. 2 illustrates a generic translator API 208 and the NTextCat library 209 as exemplary resources that may be leveraged to detect and identify a language of origin for the applicable textual component. NTextCat is an open source text classification utility, emphasizing the detection of a language, which is currently capable of detecting more than 64 languages. Although FIG. 2 illustrates a generic translator API 207 and NTextCat library 208 as the language detection resources, language validation method 200 may leverage other available language identification resources and/or other documents, while still other embodiments may access other internal or proprietary language identification and/or translation resources.

The language validation method 200 of FIG. 2 further includes determining (block 210) whether the detected language, i.e., the language detected in block 208 as the language of origin for the textual component, is a language that the LVLI server is expecting. If so, language validation method 200 jumps to a last word determination (block 214) before exiting or accessing the next word, sentence, or other textual component.

If, in block 210, language validation method 200 determines that the language detected by the applicable language detection service in block 208 is not the expected language, the textual component may be identified as a potential defect and language validation method 200 may forward the potential defect to a defect engine 220 to determine whether the potential defect is an actual defect or not.

If the defect engine determines (block 222) that a textual component flagged in block 210 as a potential defect is not a defect, language validation method 200 may update a linguistic intelligence module 240 by adding the textual component to a linguistic intelligence database 241 of linguistic intelligence module 240. with the applicable word, sentence, or other textual component while.

When language validation method 200 completes for any particular source document, the LVLI server may have produced an output file to identify all defects associated with the source document and supplemented the linguistic intelligence engine 240 with all words/sentences/etc. that were not initially recognized by the translation service used in block 208 but subsequently validated by the defect engine 220.

The output file that is supplemented with content each time the validation process illustrated in FIG. 2 identifies a linguistic defect in block 222 may be used as a tool to review and revise the original source document.

FIG. 3 illustrates the linguistic intelligence database 241 comprising a source of validating information for a word-based validation and for a sentence based validation. Specifically, a WordBase 310 illustrated in FIG. 3 contains all recognized original language words and their equivalents. FIG. 3 illustrates the structure of WordBase 310 as a data table arranged in columns and rows where the left most column 331 represents the original language, each other column corresponds to a source language, and each row represents a corresponding word. Similarly, a SentenceBase 320 illustrated in FIG. 3 includes all previously processed sentences. More specifically, the SentenceBase 320 illustrated in FIG. 3 includes, in the left most column 341, a list of sentences in the original language and a translation of each sentence in a corresponding column. Each entry in column 341 the Sentence 310 includes a corresponding translation for each of a plurality of secondary languages represented by the columns.

Depending upon the implementation, the expected language decision made in block 208 of FIG. 2 may reflect an exact match basis, in which the outcome of the determination in block 210 is yes only if the proposed translation is an exact duplication.

The discussion thus far has assumed that the source documents 102 are generated manually by one or more persons using various translation services. In other embodiments, LIE 240 may be used to perform an original-to-source translation and generate a source document such as the source documents 102 illustrated in FIG. 1A. In one such embodiment, a linguistic database 420 acquires all previously unknown words and sentences that were validated by defect engine 220.

Any one or more processes or methods described above, including processes and methods associated with the FIG. 2 flow diagram, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A language validation method, comprising:
   automatically extracting, by an information handling system, text content from a plurality of source files into a single textual string (STS) document, wherein the text content in each of the plurality of source files comprises a translation, from an original language to a source language, of a corresponding original file;
   parsing, by the information handling system, the STS document to identify each of a plurality of textual components in the STS document, wherein, said parsing comprises:
      performing a first parsing of the STS document, wherein the first parsing comprises, parsing individual words in the STS into a first list document comprising a plurality of words; and
      performing a second parsing of the STS document, wherein the second parsing comprises parsing whole sentences in the STS into a second list document comprising a plurality of sentences;
   performing language validation operations for each of the plurality of textual components in the first and second list documents, wherein the plurality of textual components in the first list document correspond to the plurality of words and wherein the plurality of textual components in the second list document correspond to the plurality of sentences, and wherein the language validation operations include:
      determining, by a language categorization utility, a language of origin of the textual component;
      determining whether the language of origin of the textual component matches the source language;
      responsive to the language of origin failing to match the source language, performing potential defect operations comprising:
         passing the textual component to a defect manager comprising one or more localization rules;
         determining, in accordance with the one or more localization rules, whether the textual component comprises a source file defect;
         responsive to determining that the textual component comprises a source file defect, logging defect information corresponding to the source file defect to a validation output file; and
         responsive to determining that the textual component does not comprise a source file defect, adding the textual component to a linguistic intelligence database, wherein textual components in the linguistic intelligence database are indexed according an original language equivalent of the textual component; and
   wherein one or more of the source files is generated from an original file by performing source file generation operations, wherein the source file generation operations include:
      identifying the plurality of textual components in the original file; and
      for each textual component in the plurality of textual components in the original file:
         indexing the linguistic intelligence database to identify a source language equivalent; and
         replacing the textual component with the source language equivalent.

2. The method of claim 1, wherein the defect information includes: the textual component, a page number identifying a location of the textual component, and a globally unique identifier of the source file defect; and a publication version is retrieved from the document.

3. The method of claim 1, wherein determining in accordance with the localization rules comprises determining instances in which:
the language of origin is the original language; and
the source language lacks a native equivalent of the textual component.

4. The method of claim 1, further comprising:
performing said source file generation operations is subject to determining that the linguistic intelligence database exceeds a threshold coverage of the source language.

5. An information handling system, comprising:
a processor;
a storage medium, accessible to the processor, including processor-executable program instructions that, when executed by the processor, cause the processor to perform operations comprising:
extracting text content from a plurality of source files into a single textual string (STS) document, wherein the text content in each of the plurality of source files comprises a translation, from an original language to a source language, of a corresponding original file;
parsing, by the information handling system, the STS document to identify each of a plurality of textual components in the STS document, wherein, said parsing comprises:
performing a first parsing of the STS document, wherein the first parsing comprises, parsing individual words in the STS into a first list document comprising a plurality of words; and
performing a second parsing of the STS document, wherein the second parsing comprises parsing whole sentences in the STS into a second list document comprising a plurality of sentences;
performing language validation operations for each of the plurality of textual components in the first and second list documents, wherein the plurality of textual components in the first list document correspond to the plurality of words and wherein the plurality of textual components in the second list document correspond to the plurality of sentences, and wherein the language validation operations include:
determining, by a language categorization utility, a language of origin of the textual component;
determining whether the language of origin of the textual component matches the source language;
responsive to the language of origin failing to match the source language, performing potential defect operations comprising:
passing the textual component to a defect manager comprising one or more localization rules;
determining, in accordance with the one or more localization rules, whether the textual component comprises a source file defect;
responsive to determining that the textual component comprises a source file defect, logging defect information corresponding to the source file defect to a validation output file; and
responsive to determining that the textual component does not comprise a source file defect, adding the textual component to a linguistic intelligence database, wherein textual components in the linguistic intelligence database are indexed according an original language equivalent of the textual component; and
wherein one or more of the source files is generated from an original file by performing source file generation operations, wherein the source file generation operations include:
identifying the plurality of textual components in the original file; and
for each textual component in the plurality of textual components in the original file:
indexing the linguistic intelligence database to identify a source language equivalent; and
replacing the textual component with the source language equivalent.

6. The information handling system of claim 5, wherein the defect information includes: the textual component, a page number identifying a location of the textual component, and a globally unique identifier of the source file defect; and a publication version is retrieved from the document.

7. The information handling system of claim 5, wherein determining in accordance with the one or more localization rules comprises determining instances wherein the language of origin is an acceptable substitute for the source language.

8. The information handling system of claim 5, wherein performing said source file generation operations is subject to determining that the linguistic intelligence database exceeds a threshold coverage of the source language.

* * * * *